United States Patent [19]

Scollard

[11] Patent Number: 4,850,099
[45] Date of Patent: Jul. 25, 1989

[54] MACHINE TOOL SPINDLE ACTUATED WORKPIECE CLAMPING SYSTEM

[75] Inventor: Roderick W. Scollard, Kent, Wash.

[73] Assignee: The Boeing Company, Seattle, Wash.

[21] Appl. No.: 79,503

[22] Filed: Jul. 30, 1987

[51] Int. Cl.⁴ .................. B23Q 7/00; B23Q 39/02; B23Q 3/155
[52] U.S. Cl. .................... 29/563; 29/564; 29/568; 269/20; 269/26; 408/56; 409/225; 409/903; 409/135; 901/41
[58] Field of Search ............ 29/564, 568, 563; 409/197, 205, 225, 226, 903, 135, 136; 269/20, 25, 26; 901/6, 41; 198/346.1, 465.1, 803.01; 60/477; 81/124.1; 408/56, 57, 59-61

[56] References Cited

U.S. PATENT DOCUMENTS

| | | | |
|---|---|---|---|
| 1,525,545 | 2/1925 | James | 81/124.1 X |
| 2,319,551 | 5/1943 | Linden et al. | 408/236 |
| 3,420,148 | 1/1969 | Doerfer et al. | 269/26 X |
| 3,488,046 | 1/1970 | Quick et al. | 269/20 |
| 4,543,970 | 10/1985 | Noh et al. | 269/20 X |
| 4,571,131 | 2/1986 | Date | 409/209 |
| 4,571,814 | 2/1986 | Palfery et al. | 29/568 |
| 4,588,067 | 5/1986 | Brems | 198/345 |
| 4,669,161 | 6/1987 | Sekelsky, Jr. | 29/563 X |

FOREIGN PATENT DOCUMENTS 2555484 5/1985 France .................. 269/20

Primary Examiner—Steven C. Bishop
Attorney, Agent, or Firm—Christensen, O'Connor, Johnson & Kindness

[57] ABSTRACT

A machining system includes at least one machine tool (10) having at least one powered spindle (12) and a plurality of tools (14A-14F) stored in a magazine (40) for automatic retrieval and return by the spindle (12). A portable fixture assembly (16A, 16B, 16C) is employed in conjunction with the machine tool (10) and the tool magazine (40) for holding a workpiece (WP) during machining by the machine tool (10). The fixture assembly (16A, 16B, 16C) includes a plurality of clamping cylinders (70, 72, 80) and a plurality of clamping assemblies (84, 86) which are actuated either by the rotational torque supplied by spindle (12) or by the coolant fluid obtained from the spindle (12). A detachable adapter tool (176, 258, 302) is employed to transmit the power supplied by spindle (12) to a power conversion system of the fixture assembly (16A, 16B, 16C), with the power conversion system converting the supply power from the spindle (12) to a form usable to actuate the clamping cylinders (70, 72, 80) and clamping assemblies (84, 86).

38 Claims, 5 Drawing Sheets

MACHINE TOOL SPINDLE ACTUATED WORKPIECE CLAMPING SYSTEM

TECHNICAL FIELD

The present invention relates to machine tool clamping systems for holding workpieces and, more particularly, to a clamping system that is actuated by the spindle of the machining tool.

BACKGROUND OF THE INVENTION

Machine tools have been developed that are programmable to carry out a number of sequential operations on a workpiece, for instance, drilling a number of holes at various locations about the workpiece. A machine tool can be programmed to drill the holes at desired depths and at the proper locations in the workpiece. The machine tools are also capable of performing a sequence of different machining operations on the workpiece, such as drilling, milling, boring, etc. Such machines typically include a magazine for holding and storing the various tools utilized by the machine tool, i.e., drill bits, milling cutters, boring bars, etc. The machine tool is programmed so its spindle automatically locates a desired tool in the magazine, and then engages the tool without the need for or the assistance of a machine operator. After performing a desired operation with the selected tool, the tool is returned to the tool magazine by the spindle and automatically disengaged from the spindle, again without the assistance of or need for a machine operator.

Machine tools also have been developed that consist of multiple work stations for performing the same or different machine operations at a number of locations about the machine tool. Typically each work station includes at least one powered spindle capable of movement in virtually any direction relative to the workpiece. The workpiece can be moved from station to station as different machining operations are performed on the workpiece. To hold the workpiece stationary, the workpiece commonly is mounted on a fixture or jig having a base and clamps that secure the workpiece to the base.

Although significant advances have been made in developing machine tools capable of performing numerous sequential machine operations utilizing different tools that are automatically selected and retrieved from a tool magazine and then later returned to a tool magazine, the development of fixtures or jigs for holding and clamping a workpiece has not kept pace with advances in the machine tools. For instance, not infrequently, the clamps used to hold the workpiece during machining by a machine tool must be positioned in the direct path of a cutting tool. Each time the cutting tool approaches the clamp, the spindle holding the tool must either be retracted or stopped until the machine operator can relocate the clamp. This is not only time-consuming, but requires that the machine operator be present to perform the clamp changing operations. If the clamp is not repositioned to avoid the path of the cutting tool, severe damage can be caused not only to the cutting tool and the clamp, but also to the workpiece. Moreover, if the clamp is not relocated properly, the workpiece may shift during subsequent machine operations. Also, if the clamp is not relocated in the same location for each workpiece, then dimensional variations or errors in the workpieces may occur.

Clamping systems for machine tools have been developed wherein several individual electrically or hydraulically operated clamps are mounted on a base or jig along with a control switch or valve for actuating the clamps. One drawback of such clamping systems is that they require electrical or hydraulic supply sources that are located externally of the machine tool. The electrical and hydraulic connections to the clamping system prevent or at least hinder the jig or fixture assembly from being shuttled among different machine tools or among the various work stations of the same machine tool. The electrical and hydraulic connections also may hinder or prevent the jig or fixture from being rotated completely around or from otherwise being freely moved about during the machining process.

SUMMARY OF THE INVENTION

The foregoing and other drawbacks and limitations are addressed by the present invention which includes a fixture assembly for holding a workpiece during machine operations performed on the workpiece by a powered spindle of a machine tool. The fixture assembly includes clamps for holding the workpiece during the machine operations and a power conversion system for actuating the clamps. An adapter tool detachably interconnects the power conversion system with the powered spindle to transmit supply power from the spindle to the power conversion system. The power conversion system converts the supply power received from the spindle into a form usable to actuate the workpiece clamps.

In a further aspect of the present invention, the clamps are actuated by pressurized fluid. The power conversion system utilizes the power obtained from the spindle of the machine tool to supply pressurized fluid to the clamping means. The supply power from the spindle may be in the form of the rotational torque of the spindle or in the form of pressurized cooling fluid from the spindle. If the supply power is in the form of rotational torque, the power conversion system may include a fluid pump in fluid flow communication with the clamps, in which case the adapter tool detachably connects the spindle to the fluid pump to utilize the rotary torque of the spindle to operate the fluid pump for supplying pressurized fluid to the clamps. If the supply power is in the form of pressurized cooling fluid, the adapter tool detachably connects the spindle to a fluid intensifier that increases the pressure of the cooling fluid received from the spindle for transmission to the clamps. The power conversion system may include a control valve disposed in fluid flow communication between the fluid pump or pressure intensifier and the clamps to control the direction of fluid flow to and from the clamps, with the control valve being operable by the spindle of the machine tool.

In a further aspect of the present invention the machine tool includes a tool magazine for holding the cutting and other tools used by the machine tool. The machine tool is programmable to cause the spindle to automatically locate, engage and then remove a desired tool from the magazine. After use of the tool, the spindle automatically returns the tool to the magazine and disengages from the tool. The adapter tools of the present invention are configured to be receiveable in and stored in the magazine in the manner of the other tools. As such, the adapter tools are automatically located and engaged by the spindle for use in transmitting supply power from the spindle to the power conversion system, for instance when actuating the clamps. After use, the adapter tools are automatically returned to the magazine by the spindle and disengaged.

In accordance with an additional aspect of the present invention the clamps and power conversion system are mounted on a base to form a self-contained portable fixture or jig. The fixture or jig may be conveniently moved from one work station to another work station of the machine tool or to a work station of a different machine tool. The movement of the fixture with the workpiece clamped thereon from work station to work station is facilitated since an external power supply need not be connected and disconnected from the fixture before the fixture can be moved, rather the power supply for actuating the clamps is derived from the same spindles that are used to perform the machine operations on the workpiece.

BRIEF DESCRIPTION OF THE DRAWINGS

The details of typical embodiments of the present invention will be described in connection with the accompanying drawings, in which.

DETAILED DESCRIPTION

Figure 1:
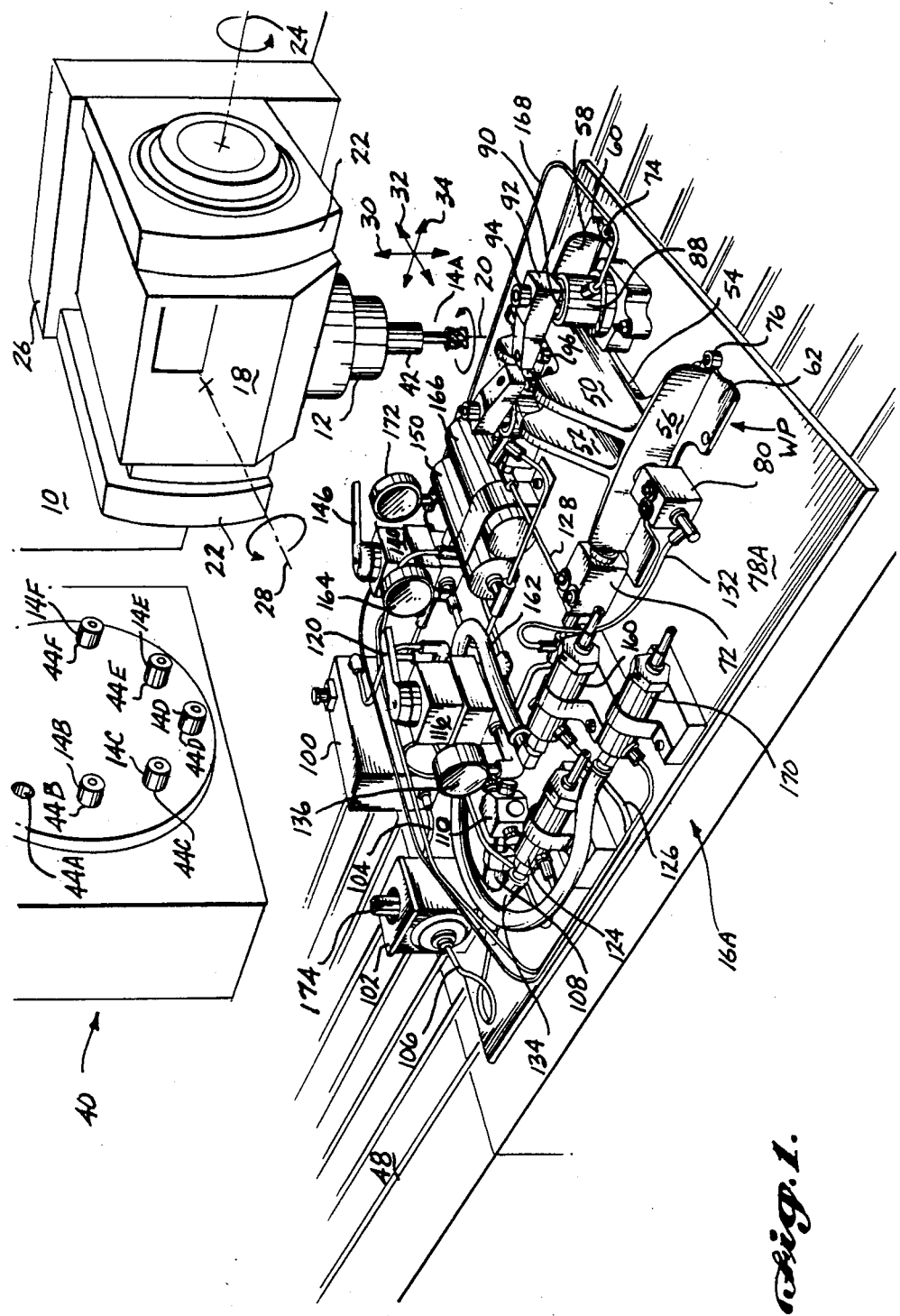
FIG. 1 is an isometric view of the present invention with portions of the present invention schematically illustrated.

Referring initially to FIG. 1, a machining system constructed according to the present invention includes a machine tool 10 having at least one powered spindle 12 for receiving various tools, for instance milling cutter 14A for milling workpiece WP clamped to a fixture assembly 16A positioned at the work station of the machine tool 10. The spindle 12 is mounted on a first head 18 to rotate about a spindle axis 20 in a well-known manner. The first head 18 is journaled on the flanges 22 to rotate about axis 24 thereby to change the orientation of the spindle 12. The flanges 22 extend transversely from a second head 26, which second head is mounted on machine tool 10 to rotate about an axis 28 extending transversely to axis 24 thereby to position spindle 12 in a selected orientation about such axis 28. It will be appreciated that by the foregoing construction of machine tool 10, spindle 12 may be moved in the orthogonal directions represented by arrows 30, 32 and 34 and rotated about axes 24 and 28 thereby to position the spindle in any desired orientation relative to the workpiece WP.

Continuing to refer specifically to FIG. 1, a tool magazine 40 is provided for receiving and storing the various tools 14A through 14F utilized by spindle 12 and illustrated in FIG. 1. Such tools may include, for example, drill bits, boring bars or milling cutters, such as milling cutter 14A, which is engaged with spindle 12. Each of the tools 14A through 14F includes a standard holder portion 42 which is engageable within spindle 12. As shown in FIG. 1, each of the tools 14A-14F has an assigned location 44A-44F in tool magazine 40. As is known in the art, the machine tool 10 may be programmed to cause the spindle 12 to automatically locate a desired tool in magazine 40, to automatically engage such tool, to remove it from the magazine and then to perform a desired machining operation. After the machining operation has been completed, the programmed machine tool causes spindle 12 to return the tool to the proper location 44A-44F in magazine 40 and then automatically disengage the tool, leaving it in the magazine for future use. All of the foregoing tool retrieval, machining and tool return operations are carried out without the assistance or presence of a machine operator. Although a single machine tool 10 and a single tool magazine 40 are illustrated in FIG. 1, it is to be understood that the machining system of the present invention may include a plurality of machine tools each having one or more powered spindles, such as spindle 12, and each having one or more tool magazines, such as magazine 40, associated therewith.

Figure 2:
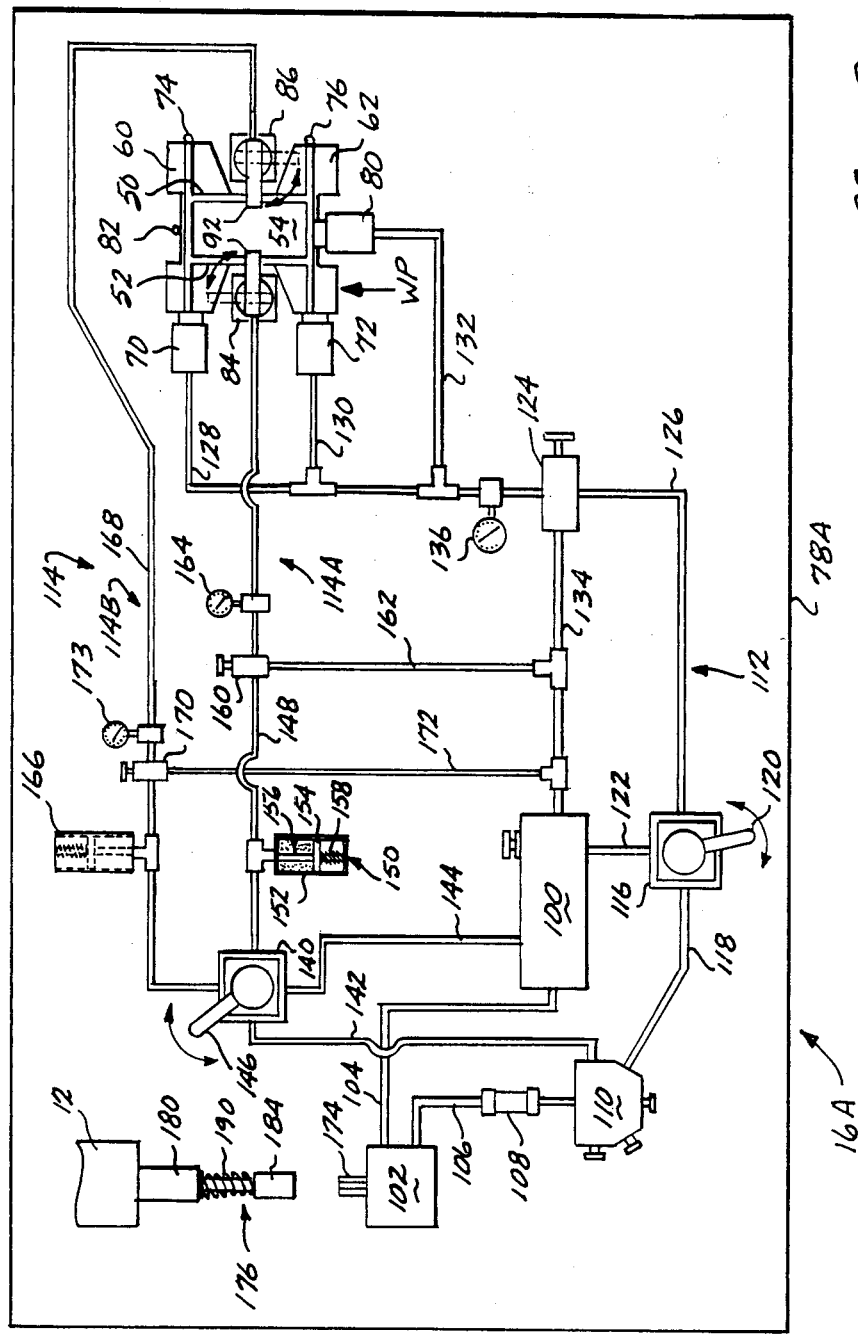
FIG. 2 is a schematically illustrated plan view of the fixture assembly shown in FIG. 1.

Next, referring to FIGS. 1 and 2, workpiece WP may be carried by the fixture assembly 16A from the work station of one machine tool to the next machine tool along a transport table 48 automatically by well-known means or by other known methods. The workpiece WP is shown as including a pair of upstanding, spaced parallel plates 50 and 52 extending upwardly from an underlying base 54. The ends of plates 50 and 52 are intersected by cross plates 56 and 58 that extend beyond the plates 50 and 52, and end flanges 60 and 62 that extend transversely from base 54 to underlie cross plates 56 and 58. As shown in FIG. 1, the milling cutter 14A engaged in the spindle 12 is used to mill arcuate, downwardly indented contours or reliefs (from the broken lines to the solid lines in FIG. 1) in the upper edge portion of upstanding plates 50 and 52. It is to be appreciated that workpiece WP is merely illustrative of one type of workpiece with respect to which the present invention may be utilized. The present invention may be employed in conjuction with virtually any workpiece that is to be machined with a machine tool having a powered spindle.

Continuing to refer specifically to FIGS. 1 and 2, the fixture assembly 16A is illustrated as being portable in nature, i.e., capable of transporting workpiece WP from one work station to another along pathway 48. The fixture assembly is illustrated as including a pair of clamping cylinders 70 and 72 which bear against one end of cross plates 56 and 58 of workpiece WP to push the opposite ends of the cross plates against locating pins 74 and 76 mounted on a flat baseplate 78A. A third clamping cylinder 80 bears against a central portion of end flange 62 to push the central portion of the opposite end flange 60 against a third locating pin 82. It will be appreciated by utilizing the three cylinders 70, 72 and 80 in conjunction with locating pins 74, 76 and 82, the workpieces WP are all located in the same position relative to baseplate 78A. Clamping cylinders of the nature of cylinders 70, 72 and 80 are standard articles of commerce.

A pair of hydraulically actuated hold-down clamp assemblies 84 and 86 are mounted on the baseplate 78A to push downwardly against the central portions of plates 50 and 52 of the workpiece WP. Each of the clamp assemblies 84 and 86 includes a cylinder portion 88 having an upwardly extending piston rod 90 which extends through an opening formed in one end of a hold-down arm 92. The hold-down arm 92 is held in engagement with piston rod 90 by a fastener, such as a capscrew 94. An adjustable pin 96 is threadably engaged with the free end portion of arm 92 to extend downwardly therefrom to bear against the upper edges of plates 50 and 52. The standout of pin 96 from arm 92 may be adjusted to correspond to the elevations of the upper edge portions of plates 50 and 52. The piston rods of the clamping assemblies are spring loaded or otherwise normally biased in the extended direction so that the presence of pressurized fluid is required to cause the hold-down arms 92 to bear downwardly against workpiece WP. Also, the clamping assemblies 84 and 86 are designed to automatically rotate the hold-down arms 92 ninety degrees into the desired "working" orientation as the clamping assemblies begin their downward travel into actuated position. Correspondingly, as the clamping assemblies return to their upward, retracted position, the hold-down arms swing back ninety degrees to their initial positions. Such clamping assemblies are standard articles of commerce, for example, Models SC1 and SC3 manufactured by Vlier.

Pressurized hydraulic fluid is supplied to the clamping cylinders 70, 72 and 80 and to the clamping assemblies 84 and 86 from a reservoir 100 mounted on the baseplate 78A by a hydraulic pump 102. Hydraulic fluid is transmitted from the reservoir 100 to the pump 102 through an inlet line 104 and then the pressurized hydraulic fluid is discharged from the pump through an outlet line 106, through a one-way check valve 108 and to a manifold 110. At the manifold 110, the hydraulic fluid is separated into two fluid circuits 112 and 114. The circuit 112 is associated with the clamping cylinders 70, 72 and 80, whereas the circuit 114 is associated with the clamping assemblies 84 and 86.

First describing the hydraulic circuit 112, hydraulic fluid from manifold 110 is directed to a control valve 116 through line 118. The control valve 116 is operable by rotation of lever or arm 120 to route hydraulic fluid entering the valve from the line 118 to either the reservoir 100 through outlet line 122 or to a pressure relief valve 124 through line 126. In accordance with the present invention, the rotation of lever 120 is accomplished by utilizing spindle 12 as a robot arm to push against the side of the lever. From the pressure relief valve 124, the pressurized hydraulic fluid is transmitted through the line 126 which branches off into three individual lines 128, 130 and 132 to supply pressurized hydraulic fluid to the clamping cylinders 70, 72 and 80, respectively. Preferably, the clamping cylinders 70, 72 and 80 are spring loaded or otherwise biased to a normally retracted position so that the presence of pressurized fluid is required to activate (e.g., extend) the cylinders. If the pressure of the hydraulic fluid in line 126 exceeds a preset level, the fluid is returned to reservoir 100 through return line 134. The pressure of the fluid in the line 126 is visually indicated by gauge 136.

Once the clamping cylinders 70, 72 and 80 have been fully extended, the pressure in the line 126 is maintained by switching the valve 116 to a "hold" position by rotation of lever 120 by use of the spindle 12. This eliminates the possible loss of pressure in the line 126 by the seepage of hydraulic fluid past pump 102. Moreover, when desiring to retract cylinders 70, 72 and 80, lever 120 is rotated to a "retract" position to cause the hydraulic fluid in line 126 to return to the reservoir 100 through the line 122. Thereupon, the hydraulic cylinders 70, 72 and 80 automatically shift to retracted condition.

Next, describing the construction of fluid circuit 114, hydraulic fluid from manifold 110 is routed to a control valve 140 through a supply line 142. From the control valve 140, the hydraulic fluid may be directed back to the reservoir 100 through a return line 144 or to either a subcircuit 114A leading to the clamp assembly 84 or a subcircuit 114b leading to the clamp assembly 86, depending upon the position of a switching lever or arm 146 of the valve.

In subcircuit 114A, pressurized hydraulic fluid from valve 140 is transmitted to clamping assembly 84 through line 148. An accumulator 150 is interposed in line 148 to store a supply of pressurized hydraulic fluid for use in cushioning subcircuit 114A against shock loads and for compensating for possible thermal extension or leakage of the hydraulic fluid. Accumulators, such as accumulators 150, are standard articles of commerce and typically include a cylinder portion 152 having an internal piston 154 slidable on a rod guide 156. A compression spring 158 extending over the guide 156 normally biases the piston to expel the hydraulic fluid within the accumulator. Subcircuit 114A also includes a manually adjustable pressure relief valve 160 that serves to return hydraulic fluid back to reservoir 100 through return line 162 if the pressure of the hydraulic fluid in line 148 exceeds a preselected level. The pressure of the hydraulic fluid in line 148 is visually indicated by gauge 164.

Hydraulic subcircuit 114B is constructed similarly to circuit 114A and, thus, it will not be described in detail. As with subcircuit 114A, subcircuit 114B includes an accumulator 166 disposed within fluid line 168 leading to clamping assembly 86. Subcircuit 114B also includes a manually adjustable relief valve 170 and a return line 172 to route hydraulic fluid from the relief valve back to the reservoir 110. The pressure of the fluid in line 168 may be ascertained from pressure gauge 173.

Figure 3:
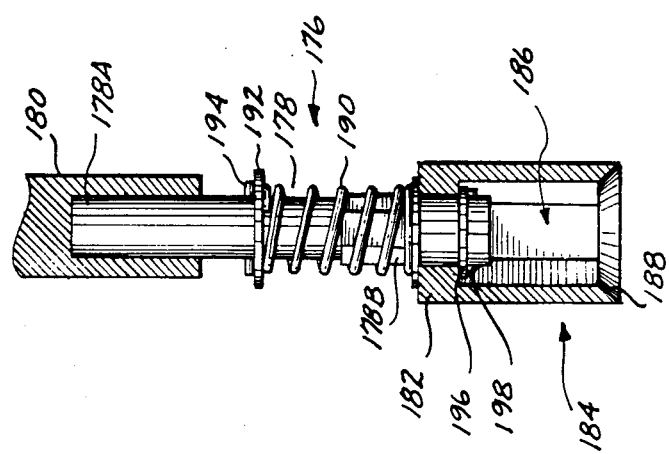
FIG. 3 is an enlarged, elevational, partially cross-sectional view of an adapter tool that may be used in conjunction with the embodiment of the present invention shown in FIGS. 1 and 2.

Additionally referring to FIG. 3, the hydraulic pump 102 includes a drive shaft 174 which may be rotated by spindle 12 through an adapter tool 176. The adapter tool 176 includes an elongated shank 178 having an upper end portion 178A fixedly engaged with a holder 180. Preferably, the holder 180 is of the same size and shape as the holders 42 of tools 14A through 14F so that the adapter tool may be stored in magazine 40 in the same manner as tools 14A–14F and also automatically engageable with and disengageable from the spindle 12 in the same manner as tools 14A–14F. The shank 178 is constructed with a lower portion 178B which is preferably square or hexagonal in cross section to slidably engage a correspondingly shaped through hole formed in the upper or head portion 182 of a drive socket 184. The socket 184 is formed with a lower interior portion 186 that is sized and shaped to engage drive shaft 174 of pump 102. For this purpose, preferably, the drive shaft 174 in cross section is square, hexagonal or of other shape to enable the socket 184 to transmit rotational torque to the drive shaft 174. Preferably, the lower edge portion of the socket 184 is beveled at 188 to facilitate engagement of the socket onto the drive shaft 174. The socket 184 is biased to slide in the downward direction on shank 178 (away from holder 180) by a compression spring 190, the lower end of which bears against the upper surface of socket head portion 182 and the upper end of which bears against a flat washer 192 which is retained by an upper cross pin 194 extending through a cross hole formed in shank 178. The socket 184 is prevented from disengagement from the shank lower end portion 178B by a washer 196 sized slightly smaller in outside diameter than the minimum interior diameter of socket interior portion 186. The washer 196 is retained on the shank lower end portion 178B by a lower cross pin 198 that extends through a cross hole formed in the shank lower end portion. It will be appreciated that by the above construction, drive socket 184 can slide upwardly along the shank lower portion 178B while enabling the shank lower portion to transmit rotational torque to the socket.

Next, the operation of the present invention will be described in conjunction with the milling of the upper edge portions of the workpiece plates 50 and 52 to form downwardly arcuate depressions therein. The workpiece WP is initially positioned on fixture assembly 16A either prior to or at the initial work station at which the workpiece is machined. After the fixture assembly 16A is positioned in proper location relative to machine tool 10, the machine tool is programmed to automatically cause spindle 12 to locate and engage adapter tool 176. With the adapter tool engaged with the spindle, the spindle acts as a robot arm to position valve switching levers 120 and 146 in proper orientation to direct hydraulic fluid from the pump 102 to the clamping cylinders 70, 72 and 80 and also to direct the hydraulic fluid to either clamping assembly 84 or 86.

Thereafter, the spindle 12 is positioned over the hydraulic pump 102 and lowered to cause the socket 182 to engage the pump drive shaft 174. If the flats on the drive shaft 174 are not aligned with the flats within the interior portion 186 of the socket 182, the spring 190 is compressed as the adapter tool 176 is lowered over the pump 102. As the spindle is initially rotated, the first time that the flats within the socket interior portion 186 aligns with the flats on drive shaft 174, spring 196 causes the socket 184 to fully seat with the drive shaft thereby enabling the spindle 12 to drive the hydraulic pump 102. When the hydraulic pump 102 is driven by the spindle 12, the clamping cylinders 70, 72 and 80 are extended to bear against the adjacent portions of workpiece WP thereby to hold the workpiece against the locating pins 74, 76 and 82, respectively. Also, the clamping assembly 84 is actuated to cause piston rod 90 to retract downwardly into cylinder 88 thereby to lower arm 92 downwardly and swing the arm to extend transversely to plate 52 (from broken line to solid line position in FIG. 2) so that pin 96, engaged with the free end of the arm, pushes downwardly against the upper edge portion of plate 52 of the workpiece WP. Thereafter, the spindle 12 is retracted away from hydraulic pump 102 and then the spindle is operated as a robot arm to use the adapter tool 176 to push against the valve levers 120 and 146 to rotate them to a "hold" position thereby to prevent leakage of hydraulic fluid back through the valves and the pump 102 so as to maintain a desired pressure level in line 126 leading to clamping cylinders 70, 72 and 80 and leading to clamping assembly 84.

Thereafter, adapter tool 176 is returned to the magazine 40 by the spindle 12 and then automatically disengaged from the spindle. The milling cutter 14A is then located by and engaged with the spindle. The milling cutter is used to mill the upper contour of workpiece plate 50. Because hydraulic fluid is not at this time being directed to clamping assembly 86, arm 92 thereof is automatically rotated to the broken line position shown in FIG. 2, out of the way of the milling cutter 14A. Next, the milling cutter 14A is returned to its proper location in the magazine 40 by the spindle 12 and the adapter tool 176 relocated by and engaged with the spindle. The spindle 12 is again employed as a robot arm to use adapter tool 176 to push against valve lever 146 to switch the valve 140 to route hydraulic fluid from pump 102 to line 168 and to simultaneously release the hydraulic pressure in line 148 thereby to permit the clamp assembly 84 to retract upwardly and automatically swing arm 92 into retracted position, parallel to plate 52 (into broken line position shown in FIG. 2). As previously noted, the clamp assembly 84 is biased to extend the piston rod 90 in the upward direction when the hydraulic fluid pressure to the clamp assembly is relieved.

Next, the adapter tool 176 is engaged with the pump drive shaft 174 and the spindle 12 is used to operate the hydraulic pump 102 to pressurize line 168 thereby actuating the clamping assembly 86 causing the clamping assembly to retract downwardly and the arm 92 thereof to swing into position so that its pin 96 is aligned over the upper edge of plate 50 to press against the upper edge portion of the plate thereby holding the workpiece stationary while the upper edge portion of workpiece plate 52 is being machined. To this end, spindle 12 is used to rotate valve lever 146 into a "hold" position to prevent leakage of hydraulic fluid through the valve 140 or pump 102 thereby to maintain the desired level of hydraulic pressure in line 168. Then the adapter tool 176 is returned to the tool magazine 40 and the tool disengaged from the spindle 12. The milling cutter 14A is retrieved from tool magazine by spindle 12 and then used to machine the arcuate contour in the upper edge portion of plate 52. When the milling operation has been completed, the cutter 14A is returned to the magazine 40. Thereafter, if required, additional machine operations may be performed on workpiece WP by spindle 12, or the fixture assembly 16A may be transported to a different work station of the machine tool 10 or to a work station of a different machine tool, not shown, for further machine operations.

It will be appreciated that the foregoing description is merely an illustration of the manner in which the present invention may be utilized to perform machining operations on a workpiece, such as workpiece WP, by using a spindle, such as spindle 12, not only to perform the machining operations, but also to operate and actuate a self-contained fixture assembly for holding the workpiece during the machining operations. The spindle not only supplies the necessary power to actuate the clamps used to hold the workpiece in a stationary position, but also is used to move or relocate the clamps to avoid interfering with cutting tools or the spindle itself. As a result, the workpiece may be machined at a work station without the need for a machine operator to operate the clamping fixture for the workpiece.

Figure 5:
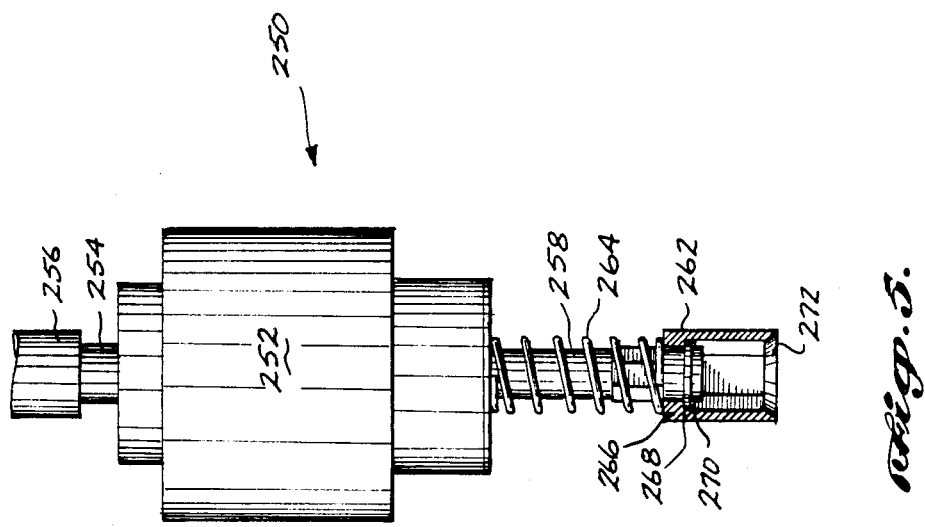
FIG. 5 is an enlarged, elevational, partially cross-sectional view of an adapter tool that may be used in conjunction with the fixture assembly of FIG. 4; and, FIG. 6 is a schematically illustrated plan view of another preferred embodiment of a fixture assembly of the present invention.
Figure 4:
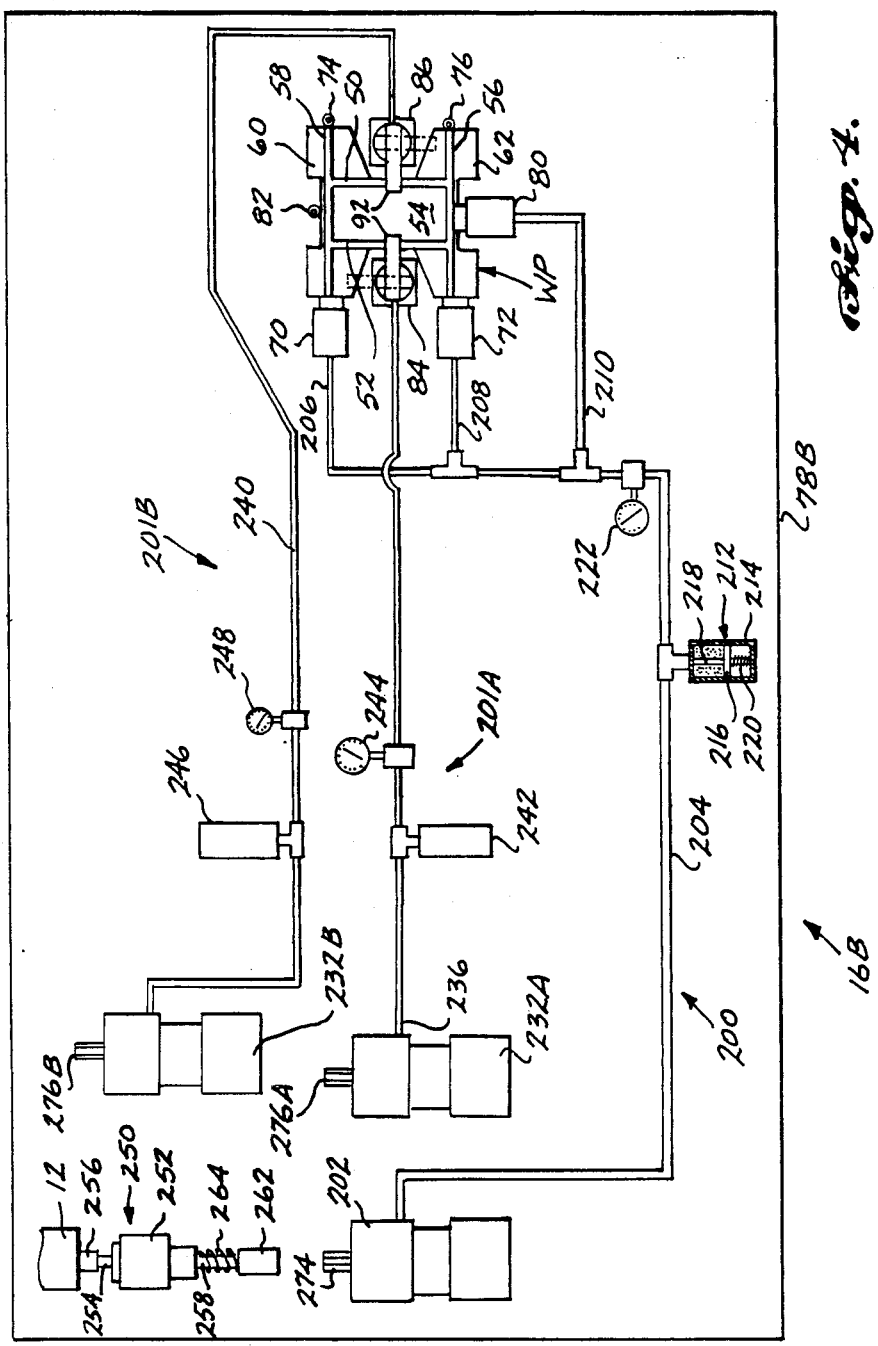
FIG. 4 is a schematically illustrated plan view of a further preferred embodiment of a fixture assembly of the present invention.

FIGS. 4 and 5 illustrate a further preferred embodiment of the present invention wherein workpiece WP is mounted on a fixture assembly 16B by fluid circuits 200, 201A and 201B using clamping cylinders and clamping assemblies similar to those used in fixture assembly 16A. Accordingly, the corresponding part numbers for the clamping cylinders, clamping assemblies and locating pins employed in FIGS. 1 and 2 are also used in FIG. 4.

In fluid circuit 200 of fixture assembly 16B, pressurized hydraulic fluid is supplied to the clamping cylinders 70, 72 and 80 through the use of a screw-type displacement pump 202 having an internal hydraulic fluid reservoir, as is well known in the art. Such pumps are standard articles of commerce. An illustrative, but not limiting, example of such a pump is the Vlier screw pump Model No. SP-621. One advantage of utilizing a screw-type displacement pump, such as pump 202, is that a separate fluid reservoir is not required thereby simplifying the hydraulic circuit of the fixture assembly 16B relative to fixture assembly 16A. One possible drawback of using this type of hydraulic pump is that such pumps typically have a limitation in their volume capacities and, thus, the number of clamping cylinders that may be actuated by a single screw-type displacement pump may be less than can be actuated with a rotary-type pump, for instance, pump 102 employed on fixture assembly 16A. Nonetheless, a screw-type hydraulic pump may be ideal for smaller clamping fixtures.

Pump 202 is connected to clamping cylinders 70, 72 and 80 through line 204 which branches into individual delivery lines 206, 208 and 210. An accumulator 212 is interposed in line 204. As with accumulators 150 and 166, accumulator 212 includes a cylinder portion 214 having a close-fitting piston 216 slidable therein on a center shaft 218. A compression spring 220 biases piston 216 toward the outlet end of the accumulator. By this construction, the accumulator functions to store a supply of a pressurized hydraulic fluid to cushion the circuit 200 from shock loads, thermal expansion and leakage problems. A pressure gauge 222 also is interposed in hydraulic line 204 to provide a visual indication of a pressure of the hydraulic fluid in the line.

Referring specifically to FIG. 4, in fluid circuit 201A clamping assembly 84 is actuated by a screw displacement pump 232A for supplying pressurized hydraulic fluid to the clamp assembly. Preferably, the screw displacement pump 232A is identical or similar to pump 202, previously described. Pressurized hydraulic fluid from the pump 232A is directed to the clamp assembly 84 through the line 236. An accumulator 242 and a pressure gauge 244 are interposed in line 236. Preferably, the accumulator 242 is similar or the same in construction and/or operation as the accumulator 214.

Fluid circuit 201B is similar in construction and operation to fluid circuit 201A. In fluid circuit 201B, clamping assembly 86 is actuated by a screw displacement pump 232B for supplying pressurized hydraulic fluid to the clamping assembly. Pressurized hydraulic fluid from pump 232B is directed to the clamping assembly 86 through a line 240. An accumulator 246 and a pressure gauge 248 are interposed in the line 240. Preferably, the screw displacement pump 232B and the accumulator 246 are of the same construction and operation as pump 232A and accumulator 242.

Referring additionally to FIG. 5, screw pumps 202, 232A and 232B are detachably connectable with spindle 12 through an adapter tool 250. The adapter tool 250 is similar in construction and function to the adapter tool 176 utilized in fixture assembly 16A, with the addition of a torque limiting clutch 252 to limit the driving torque applied to screw pumps 202, 232A and 232B to coincide with the desired pressure level in hydraulic circuits 200, 201A and 201B. Clutches, such as clutch 252, are standard articles of commerce. An exemplary, but not limiting, example of such a clutch includes Helland Research and Engineering, Inc., "TorqTender", Catalog #TT3X. Clutch 252 has an upper input shaft 254 on which is mounted tool holder 256 which is preferably identical to tool holder 180 used in conjunction with adapter tool 176. Adapter tool 250 also includes a lower output shaft 258 having a square or hexagonally-shaped lower end portion that slidably engages within a correspondingly-shaped bore formed in a socket 262. As with socket 184 of tool holder 176, preferably socket 262 is biased in the downward direction by a compression spring 264, the upper end of which bears against the lower end of clutch 252 and the lower end of which bears against the upper surface of the head portion 266 of the socket 262. The socket 262 is retained on the output shaft 258 by a washer 268 and a cross pin 270 which is snugly engaged within a cross hole formed in the lower end portion of shaft 258. As with socket 182, the lower edge portion of socket 262 is beveled at 272 to facilitate the engagement of the socket with the drive shafts 274, 276A and 276B of hydraulic pumps 202, 232A and 232B.

Fixture assembly 16B is "operated" by spindle 12 in a manner similar to the operation of fixture assembly 16A by the spindle, discussed above. Thus, to avoid repetition, the operation of fixture assembly 16B will only be briefly described. In fixture assembly 16B, clamping cylinders 70, 72 and 80 are simply actuated by utilizing spindle 12 to power screw-type pump 202 by engagement of the adapter tool 250 with drive shaft 274. As previously discussed, if the flats of the socket 262 are not initially aligned with the flats of drive shaft 274, the socket will slide upwardly along shaft 258 as a spindle 12 is lowered over the hydraulic pump 202. Thereafter, as spindle 12 begins to rotate socket 262 when the flats of the socket first align with the flats of the pump drive shaft 274, spring 264 forces socket 262 downwardly into full engagement with the drive shaft. When the desired and predetermined pressure level at clamping cylinders 70, 72 and 80 has been achieved, the input shaft 254 of clutch 252 slips relative to the output shaft 258 of the clutch. Thereafter, spindle 12 is disengaged from the hydraulic pump 202.

Next, spindle 12 is positioned over pump 232A to engage adapter tool 250 over drive shaft 276A. After clamping assembly 84 has been actuated by using spindle 12 to drive pump 232A, the spindle automatically returns the adapter tool 250 to the tool magazine 40 and then automatically locates and engages with the milling cutter 14A which is used to mill the top contour of the upper edge portion of plate 50 of workpiece WP as described above relative to fixture assembly 16A. Thereafter, the milling cutter is returned to the tool magazine 40 and disengaged from the spindle 12.

The spindle 12 then relocates and retrieves the adapter tool 250 from the tool magazine. The spindle is then utilized to rotate drive shaft 276A of pump 232A in reverse direction to depressurize line 236 of circuit 201A which is connected to clamping assembly 84. As discussed above relative to fixture assembly 16A, when line 236 is depressurized, arm 92 automatically retracts upwardly from and swings ninety degrees away from plate 52 (from the solid line to the broken line position in FIG. 4).

Next, the adapter tool 250 is engaged with a drive shaft 276B of the pump 232B to pressurize the line 240 of circuit 201B to actuate the clamping assembly 86 by simultaneously lowering and swinging arm 92 of the clamping assembly to bear against the upper edge of plate 50. The spindle 12 is programmed to then automatically return the adapter tool 250 to the magazine 40 and retrieve the milling cutter 14A, which is used to form the desired contour in the upper edge portion of plate 52 of workpiece WP. Thereafter, the spindle 12 may be employed to perform other machining operations on the workpiece, or the fixture assembly 15B may be moved to another work station of the machine tool 10 or to the work station of another machine tool, not shown.

Although the fixture assemblies 16A and 16B have been described as utilizing hydraulic fluid as a medium for actuating the clamping cylinders 70, 72 and 80 and the clamping assemblies 84 and 86, it is to be understood that other types of fluids, such as air, also may be employed without departing from the spirit or scope of the present invention. If air is employed as a working medium in the fixture assemblies 16A and 16B, components utilizing air are commercially available to replace those described above.

Figure 6:
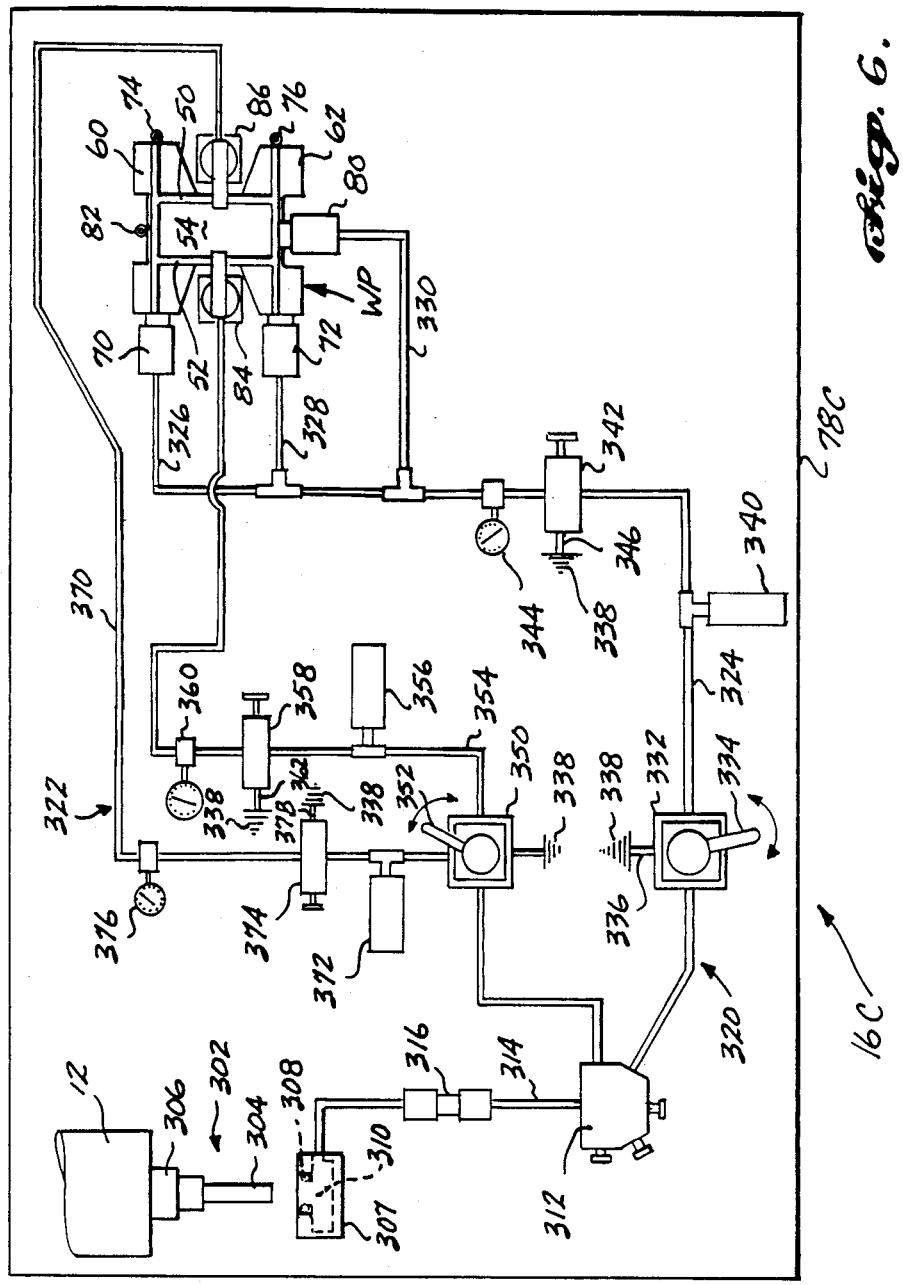

Next referring to FIG. 6, another preferred embodiment of the present invention is illustrated wherein workpiece WP is mounted on the baseplate 78C of fixture assembly 16C. The fixture assembly 16C is similar to fixture assemblies 16A and 16B whereby the workpiece WP is securely mounted on the base 78C by clamping cylinders 70, 72, and 80 and by clamping assemblies 84 and 86 together with locating pins 74, 76 and 82. However, the fixture assembly 16C differs from the previously described fixture assemblies 16A and 16B by the utilization of the coolant fluid that is supplied through the spindle 12 to power the clamping cylinders and assemblies. Cooling fluid is typically routed through the center of a spindle of a machine tool for cooling the cutting tool being used by the machine tool. For example, cooling fluid is commonly routed through the center of a machine tool spindle to deliver the cooling fluid to passageways extending through the interior of a drill bit used to drill deep holes in a workpiece.

In the present invention, the coolant fluid is transmitted from the spindle 12 to fixture assembly 16C through the use of an adapter tool 302 composed of a hollow tube 304 extending through the center of a tool holder 306. To facilitate the engagement of the adapter tool 302 with the spindle 12 and also for storage of the adapter tool in the tool magazine 40, preferably the holder 306 is of the same or similar construction as holders 42, 180 and 256, previously described. The tube 304 routes the cooling fluid flowing through the center of the spindle 12 to a coupler 307 mounted on the baseplate 78C. The coupler 306 preferably includes a seal 308 housed in the entrance to an internal reception cavity of the coupler to snugly and slidably receive the lower end of the tube 304. From the cavity 310, the cooling fluid is routed to a manifold 312 through a line 314. A fluid intensifier 316 is interposed in the line 314 to increase the pressure of the cooling fluid received from the spindle 12 to a level sufficient to actuate the clamping cylinders 70, 72 and 80 and the clamping assemblies 84 and 86.

As illustrated in FIG. 6, the clamping fixture 16C utilizes two fluid circuits 320 and 322 which are constructionally and operationally very similar to corresponding hydraulic circuits 112 and 114 of fixture assembly 16A. Accordingly, the fluid circuits 320 and 322 will only be briefly described so as to avoid needless repetition.

The fluid circuit 320 includes a fluid supply line 324 that divides into three branch lines 326, 328 and 330 to route the pressurized cooling fluid to the clamping cylinders 70, 72 and 80, respectively. As in the hydraulic circuit 112, the circuit 320 also includes a directional control valve 332 actuated by a control lever 344 which is operated by utilizing the spindle 12 in the manner of a robot arm. An outlet line 336 routes the cooling fluid from valve 332 back to a collection sump, not shown, at the machine tool 10 for return to a cooling fluid storage tank, which storage tank is schematically illustrated in FIG. 6 as 338. Fluid supply line 324 is interconnected to outlet line 336 through valve 332, for instance, when desiring to retract clamping cylinders 70, 72 and 80.

Hydraulic circuit 320 also includes an accumulator 340 which preferably is identical or at least similar in operation to accumulators 150 and 166 utilized in fixture assembly 16A. Hydraulic circuit 320 also includes an adjustable pressure relief valve 342 and a pressure gauge 344 that are similar or identical to pressure relief valve 124 and gauge 136 utilized in hydraulic circuit 112 of fixture assembly 16A. As shown in FIG. 6, line 346 returns cooling fluid from the relief valve 342 to the collection sump at the machine tool 10.

The fluid circuit 322 includes a directional control valve 350 which is operated through the rotation of lever 352 by utilizing spindle 12 to push adapter tool 302 against the lever 352. The directional control valve 350 is connected to clamping assembly 84 through a line 354 in a manner similar to line 148 of clamping assembly 16A. As in clamping assembly 16A, an accumulator 356, an adjustable relief valve 358 and a pressure gauge 360 are interposed in line 354. As shown in FIG. 6, line 362 returns the cooling fluid from the relief port of valve 358 to the collection sump of machine tool 10 for eventual return to the storage tank 338.

Also in a manner similar to the fixture assembly 16A, the control valve 350 is interconnected with the clamping assembly 86 through a line 370. An accumulator 372, a relief valve 374 and a pressure gauge 376 are interposed in the line 370. Line 378 returns the cooling fluid from the relief port of valve 374 to the collection sump of the machine tool 10.

The operation of fixture assembly 16C is very similar to the above-described operation of fixture assembly 16A, with the exception that rather than utilizing the rotational torque from spindle 12 to power a hydraulic pump, the coolant fluid from spindle 12 is supplied to the fixture assembly through adapter tool 302 and coupler 307 and then the coolant fluid is increased in pressure by an intensifier 316. Thus, as will be appreciated, the advantages provided by fixture assembly 16A are also provided by fixture assembly 16C, including the storage of adapter tool 302 in magazine 40 and the use of spindle 12 together with the adapter tool as a robot arm to switch directional valves 332 and 352.

As will be apparent to those skilled in the art in which the invention is addressed, the present invention may be embodied in forms other than those specifically disclosed above without departing from the spirit or essential characteristics of the invention. The particular embodiments of machine tool 10, magazine 40 and clamping assemblies 16A, 16B and 16C, as described above, are therefore to be considered in all respects as illustrative and not restrictive. The scope of the present invention is as set forth in the appended claims rather than being limited to the examples set forth in the foregoing description.

The embodiments of the invention in which an exclusive property or privilege is claimed are defined as follows:

1. A fixture assembly for holding a workpiece during machining operations performed on the workpiece by a powered spindle of a machine tool, comprising:
   (a) clamping means for holding the workpiece during the machining operations performed on the workpiece;
   (b) means for activating said clamping means; and,
   (c) adapter means for interconnecting the spindle of the machine tool with said activating means to transmit power from the spindle to said activating means for operating said clamping means, said adapter means transmitting pressurized fluid from the machine tool spindle to said activating means.

2. A fixture assembly for holding a workpiece during machining operations performed on the workpiece by a powered spindle of a machine tool, the machine tool having a coolant fluid supply for supplying coolant fluid to the spindle for a tool being held by the spindle, the fixture assembly comprising:
   (a) clamping means actuated by pressurized fluid for holding the workpiece during the machining operations performed on the workpiece;
   (b) means for activating said clamping means utilizing the power obtained from the spindle to supply pressurized fluid to said clamping means;
   (c) adapter means for interconnecting the spindle of the machine tool with said activating means to transmit power from the spindle to said activating means for operating said clamping means, said adapter means being detachably connectable to the machine tool spindle to receive the coolant fluid supplied to the spindle, said adapter means also being detachably engageable with said activating means to transmit the coolant fluid from the spindle to said power supply means; and,
   (d) said activating means including a fluid pressure intensifier disposed in fluid flow communication with said clamping means to increase the pressure of the coolant fluid received from the spindle.

3. A fixture assembly according to claim 2, wherein:
   the machine tool utilizing tools held by a tool holder shaped to be engageable with the spindle of the machine tool; and,
   said adapter means having portions configured to correspond to the shape of the tool holder.

4. A fixture assembly according to claim 3, wherein:
   the machine tool having tool magazine for receiving and storing tools used by the machine tool; and,
   said adapter means having a first component being configured to be receivable in and stored in the tool magazine of the machine tool.

5. A fixture assembly according to claim 4, wherein said adapter means having a second component in fluid flow communication with said pressure intensifier and being detachably engageable with said first component of said adapter means.

6. A fixture assembly according to claim 5, wherein:
   the first component of said adapter means including an output tube for transmitting coolant fluid from the machine tool spindle to said activating means; and,
   the second component of said adapter means including a coupler in fluid flow communication with said fluid intensifier and detachably connectable with the output tube of the first component of said adapter means.

7. A portable fixture assembly for holding a workpiece during machining operations performed on the workpiece by powered spindles located at spaced-apart work stations, said portable fixture assembly comprising:
   (a) a base;
   (b) clamping means mounted on said base for holding on the workpiece during machining of the workpiece;
   (c) a power conversion system for actuating said clamping means;
   (d) adapter means for detachably interconnecting the power conversion system with the powered spindles to transmit supply power from the spindles to the power conversion system, said power conversion system converting the supply power received from the spindles into a form usable to actuate said clamping means; and,
   (e) wherein the supply power from the spindles is in the form of pressurized fluid.

8. A portable fixture assembly for holding a workpiece during machining operations performed on the workpiece by powered spindles located at spaced-apart work stations, said portable fixture assembly comprising:
   (a) a base;
   (b) clamping means mounted on said base and actuated by pressurized fluid for holding on the workpiece during machining of the workpiece;
   (c) a power conversion system utilizing the power obtained from the spindles to supply pressurized fluid to the clamping means for actuating the said clamping means;
   (d) adapter means for detachably interconnecting the power conversion system with the powered spindles to transmit supply power from the spindles to the power conversion system, said power conversion system converting the supply power received from the spindles into a form usable to actuate said clamping means;
   (e) wherein said power conversion system including a fluid pump in fluid flow communication with said clamping means;
   (f) wherein said adapter means detachable connecting the spindles to said fluid pump to utilize the rotary torque of the spindles to operate the fluid pump for supplying pressurized fluid to said clamping means; and,
   (g) wherein said power conversion system further comprises at least one control valve disposed in fluid flow communication with said fluid pump and said clamping means to control the direction of fluid flow to and from said clamping means, said control valve having switch means operable by the spindles.

9. A portable fixture asmembly for holding a workpiece during machining operations performed on the workpiece by powered spindles located at spaced-apart work stations, said portable fixture assembly comprising:
   (a) a base;
   (b) clamping means mounted on said base for holding on the workpiece during machining of the workpiece;
   (c) a power conversion system for actuating said clamping means;
   (d) adapter means for detachably interconnecting the power conversion system with the powered spindles to transmit supply power from the spindles to the power conversion system, said power conversion system converting the supply power received from the spindles into a form usable to actuate said clamping means;
(e) wherein the spindles having a cooling fluid supply; and,
(f) said adapter means detachably connecting said spindles to said power conversion system to transmit cooling fluid from the spindles to said power conversion system.

10. A portable fixture assembly according to claim 9, wherein said power conversion system comprises a fluid pressure intensifier disposed in fluid flow communication with said clamping means to increase the pressure of the cooling fluid received from the spindles.

11. A portable fixture assembly according to claim 9, wherein:
said spindles employing a plurality of tools having a standard holder portion engageable with the spindles;
said adapter means having a holder portion corresponding to the holder portions of the tools utilized by the spindles and having a fluid outlet portion detachably connectable to said power conversion system.

12. A machining system, comprising:
(a) at least one machine tool having at least one powered spindle for receiving various tools utilized by the machine tool, the tools having a standard holder portion engageable with the spindle of the machine tool;
(b) a portable fixture assembly, comprising:
a base;
clamping means mounted on said base for holding a workpiece during machining of the workpiece; and,
a power conversion system for actuating the clamping means;
(c) an adapter detachably interconnecting the spindle of the machine tool to said power conversion system to transmit supply power from the spindle to said power conversion system, said power conversion system converting the supply power from the spindle to a form usable to actuate said clamping means; and,
(d) wherein the supply power is in the form of pressurized fluid.

13. A machining system, comprising:
(a) at least one machine tool having at least one powered spindle for receiving various tools utilized by the machine tool, the tools having a standard holder portion engageable with the spindle of the machine tool;
(b) a portable fixture assembly, comprising:
a base;
clamping means mounted on said base and actuated by pressurized fluid for holding a workpiece during machining of the workpiece; and,
a power conversion system for actuating the clamping means by utilizing the power obtained from the spindle of the machine tool to supply pressurized fluid to said clamping means;
(c) an adapter detachably interconnecting the spindle of the machine tool to said power conversion system to transmit supply power from the spindle to said power conversion system, said power conversion system converting the supply power from the spindle to a form usable to actuate said clamping means; and,
(d) wherein said power conversion system further comprises valve means disposed in fluid flow communication with said clamping means to control the direction of flow of pressurized fluid to and from the clamping means, said valve means being actuated by the spindle of said machine tool.

14. A method for machining a workpiece, comprising:
mounting a workpiece on a portable clamping fixture having a base and clamping means mounted on the base for holding the workpiece during the machining of the workpiece;
positioning the fixture at the work station of a machine tool having a powered spindle;
actuating the clamp means of the portable fixture assembly with the spindle of the machine tool; and,
utilizing pressurized fluid from the spindle to actuate the clamping means.

15. A fixture assembly for holding a workpiece during machining operations performed on the workpiece by a powered spindle of a machine tool, comprising:
(a) clamping means on the fixture assembly for holding the workpiece during the machining operations performed on the workpiece;
(b) means on the fixture assembly for activating said clamping means;
(c) adapter means for interconnecting the spindle of the machine tool with said activating means to transmit power from the spindle to said activating means for operating said clamping means;
(d) said clamping means being actuated by pressurized fluid; and,
(e) said activating means utilizing the power obtained from the spindle to supply pressurized fluid to said clamping means, said activating means further comprises control valve means disposed in fluid flow communication with said clamping means to control the direction of fluid flow to and from said clamping means, said control valve means having switching means operable by the spindle of the machine tool.

16. A portable fixture assembly for holding a workpiece during machining operations performed on the workpiece by powered spindles located at spaced-apart work stations, said portable fixture assembly, comprising:
(a) a base;
(b) clamping means mounted on said base for holding on the workpiece during machining of the workpiece;
(c) a power conversion system on said base for actuating the said clamping means;
(d) adapter means for detachably interconnecting the power conversion system with the powered spindles to transmit supply power from the spindles to the power conversion system, said power conversion system converting the supply power received from the spindles into a form usable to actuate said clamping means;
(e) said clamping means being actuated by pressurized fluid; and,
(f) said power conversion system utilizing the power obtained from the spindles to supply pressurized fluid to said clamping means, said power conversion system further comprises control valve means disposed in fluid flow communication with said clamping means to control the direction of fluid flow to and from said clamping means, said control valve means having switching means operable by the spindles.

17. A machining system, comprising:
(a) at least one machine tool having at least one powered spindle for receiving various tools utilized by the machine tool, the tools having a standard holder portion engageable with the spindle of the machine tool;
(b) a portable fixture assembly, comprising:
a base;
clamping means mounted on said base for holding a workpiece during machining of the workpiece; and,
a power conversion system for actuating the clamping means;
(c) an adapter detachably interconnecting the spindle of the machine tool to said power conversion system to transmit supply power from the spindle to said power conversion system, said power conversion system converting the supply power from the spindle to a form usable to actuate said clamping means;
(d) said clamping means being actuated by pressurized fluid; and,
(e) said power conversion system utilizing the power obtained from the spindle of the machine tool to supply pressurized fluid to said clamping means, said power conversion system further comprises control valve means disposed in fluid flow communication with said clamping means to control the direction of fluid flow to and from said clamping means, said control valve means having switching means operable by the spindle of said machine tool.

18. A fixture assembly for holding a workpiece during machining operations performed on the workpiece by a powered spindle of a machine tool, comprising:
(a) clamping means actuated by pressurized fluid for holding the workpiece during the machining operations performed on the workpiece;
(b) means for activating said clamping means by utilizing the power obtained from the spindle to supply pressurized fluid to said clamping means, said activating means comprising a fluid pump in fluid flow communication with said clamping means;
(c) adapter means detachably interconnecting the spindle of the machine tool with said activating means to utilize the rotary torque of the spindle to operate said fluid pump for supplying pressurized pressure fluid to said clamping means for operating said clamping means; and,
(d) wherein said activating means further comprises a control valve disposed in fluid flow communication between said pump and said clamping means to control the direction of fluid flow to and from said clamping means, said control valve having switching means operable by the spindle of the machine tool.

19. A fixture assembly for holding a workpiece during machining operations performed on the workpiece by a powdered spindle of a machine tool, comprising:
(a) clamping means on the fixture assembly for holding the workpiece during the machining operations performed on the workpiece;
(b) means on the fixture assembly for activating said clamping means;
(c) adapter means for interconnecting the powered spindle of the machine tool with said activating means to transmit torque from the spindle to said activating means for operating said clamping means;
(d) said clamping means being actuated by pressurized fluid;
(e) said activating means comprising a fluid pump in fluid flow communication with said clamping means; and,
(f) said adapter means detachably connecting the spindle to said fluid pump to utilize the rotary torque of the spindle to operate said fluid pump for supplying pressurized fluid to said clamping means.

20. A fixture assembly according to claim 19, wherein said activating means further comprises a fluid reservoir disposed in fluid flow communication between said fluid pump and said clamping means.

21. A fixture assembly according to claim 19, wherein:
said fluid pump having a drive shaft; and,
said adapter means comprising a first engagement portion detachably engageable with the machine tool spindle, and a second engagement portion detachably engageable with said fluid pump drive shaft.

22. A fixture assembly according to claim 21, wherein said adapter second engagement portion having a socket for engagement with the drive shaft of said fluid pump.

23. A fixture assembly according to claim 22, wherein the socket of said adapter means being movable relative to the first engagement portion of said adapter means along a common rotational axis with the first engagement portion of said adapter means, and said adapter means further comprising biasing means for biasing said socket away from said first engagement portion.

24. A fixture assembly according to claim 19, wherein:
the machine tool includes a tool magazine for holding a plurality of tools utilized by the machine tool, said tools being automatically engageable with and disengageable from the machine tool spindle; and,
said adapter means being configured to be receivable and stored within the tool magazine, and to be automatically engageable with and disengageable from the machine tool spindle.

25. A fixture assembly according to claim 19, wherein said adapter means having:
a first engagement portion being detachably engageable with the spindle of the machine tool; and,
a second engagement portion being detachably engageable with said activating means.

26. A fixture assembly according to claim 25, wherein:
the machine tool including a magazine for receiving and storing tools utilized by the machine tool spindle;
the spindle automatically obtaining selected tools from and returning the selected tools to the magazine; and,
said adapter means being configured to be received and stored within the tool magazine and to be automatically retrieved from and returned to the tool magazine by the spindle of the machine tool.

27. A fixture assembly according to claim 19 wherein:
said clamping means includes at least one clamping member for bearing against a workpiece to hold the workpiece stationary on the fixture assembly; and, said activating means is operable by the powered spindle to selectively engage the clamping member against the workpiece and subsequently to retract and reposition the clamping member away from the workpiece and out of the path of travel of the powered spindle during machining operations.

28. A portable fixture assembly for holding a workpiece during machining operations performed on the workpiece by powered spindles located at spaced-apart work stations, said portable fixture assembly comprising:
(a) a base;
(b) clamping means mounted on said base for holding on to the workpiece during machining of the workpiece;
(c) a power conversion system on said base for actuating the said clamping means;
(d) adapter means for detachably interconnecting the power conversion system with the powered spindles to transmit supply torque from the spindles to the power conversion system, said power conversion system converting the supply torque received from the spindles into a form usable to actuate said clamping means;
(e) said clamping means being actuated by pressurized fluid;
(f) said power conversion system including a fluid pump in fluid flow communication with said clamping means; and,
(g) said adapter means detachably connecting the spindles to said fluid pump to utilize the rotary torque of the spindles to operate the fluid pump for supplying pressurized fluid to said clamping means.

29. A portable fixture assembly according to claim 28, wherein:
the spindles utilizing a plurality of different tools having a standard holder portion engageable with the spindles;
said fluid pump having a drive shaft; and,
said adapter means having a holder portion corresponding to the holder portions of the tools utilized by the spindles and an engagement portion detachably engageable with the drive shaft of said fluid pump.

30. A portable fixture assembly according to claim 28, wherein said power conversion system further comprises a fluid reservoir in fluid flow communication with and disposed between said fluid pump and said clamping means.

31. A portable fixture assembly according to claim 28, wherein:
the spindle utilizing a plurality of tools, said tools having a standard holder portion engageable with the spindles; and,
said adapter means having a holder portion of a configuration corresponding to the holder portions of the tools utilized by the spindles.

32. A portable fixture assembly according to claim 31, wherein:
the tools utilized by the spindles are kept in a magazine, with the tools being retrievable from and returned to the magazine by the spindles; and
said adapter means being configured to be storable in the tool magazine to be retrieved from and returned to the magazine by the spindles.

33. A portable fixture assembly according to claim 28 wherein:
said clamping means includes at least one clamping member for bearing against a workpiece to hold the workpiece stationary on the portable fixture assembly; and,
said power conversion systems is operable by the powered spindle to selectively engage the clamping member against the workpiece and subsequently to retract and reposition the clamping member away from the workpiece and out of the path of travel of the powered spindles during machining operations.

34. A machining system, comprising:
(a) at least one machine tool having at least one powered spindle for receiving various tools utilized by the machine tool, the tools having a standard holder portion engageable with the spindle of the machine tool;
(b) a portable fixture assembly, comprising:
a base;
clamping means mounted on said base for holding a workpiece during machining of the workpiece; and,
a power conversion system mounted on said base for actuating the clamping means;
(c) an adapter detachably interconnecting the spindle of the machine tool to said power conversion system to transmit supply torque from the spindle to said power conversion system, said power conversion system converting the supply torque from the spindle to a form usable to actuate said clamping means;
(d) said clamping means being actuated by pressurized fluid;
(e) said power conversion system comprising a fluid pump in fluid flow communication with said clamping means; and,
(f) said adapter detachably connecting the machine tool spindle to said fluid pump to utilize the rotary torque of the spindle to operate the fluid pump for supplying pressurized fluid to said clamping means.

35. A machining system according to claim 34:
further comprising a magazine for storing the tools utilized by the machine tool;
wherein the spindle of said machine tool being programmable to retrieve the tools from the magazine and return the tools to the magazine; and,
wherein the adapter being configured to be stored in the magazine and being retrieved from and returned to the magazine by the spindle.

36. A machining system according to claim 34 wherein:
said clamping means includes at least one clamping member for bearing against a workpiece to hold the workpiece stationary on the portable fixture assembly; and,
said power conversion system is operable by the powered spindle to selectively engage the clamping member against the workpiece and to retract and reposition the clamping member away from the workpiece and out of the path of travel of the various tools carried by the powered spindle of the machine tool during machining operations.

37. A machining system, comprising:
(a) at least one machine tool having at least one powered spindle for receiving various tools utilized by the machine tool, the tools having a standard holder portion engageable with the spindle of the machine tool;

(b) a portable fixture assembly, comprising:
a base;
clamping means mounted on said base and actuated by pressurized fluid for holding a workpiece during machining of the workpiece; and,
a power conversion system utilizing the power obtained from the spindle of the machine tool to supply pressurized fluid to the clamping means;
(c) an adapter detachably interconnecting the spindle of the machine tool to said power conversion system to transmit supply power from the spindle to said power conversion system, said power conversion system converting the supply power from the spindle to a form usable to actuate said clamping means;
(d) wherein the spindle having a cooling fluid supply; and,
(e) wherein said adapter detachably connecting said spindle to said power conversion system to transmit cooling fluid from the spindle to the power conversion system.

38. A machining system according to claim 37, wherein said power conversion system comprises a fluid intensifier disposed in fluid flow communication with said clamping means to increase the pressure of the cooling fluid received from the spindle.

* * * * *